United States Patent [19]

Wood, III et al.

[11] 3,752,240

[45] Aug. 14, 1973

[54] METHOD OF AND APPARATUS FOR PROVIDING AN IMPACT TO A VEHICLED CARRIED PENETRATING TOOL

[75] Inventors: Charles D. Wood, III, San Antonio; John M. Clark, Jr., Seguin, both of Texas

[73] Assignee: Southwest Research Institute, San Antonio, Tex.

[22] Filed: Dec. 23, 1971

[21] Appl. No.: 211,282

[52] U.S. Cl............... 173/1, 37/DIG. 18, 172/788, 173/24, 173/112, 299/70
[51] Int. Cl. ............................ E02f 1/00, E02f 3/76
[58] Field of Search.......................... 299/37, 69, 70; 173/1, 24; 172/781, 788; 37/DIG. 18, 2; 293/DIG. 1; 175/296, 297

[56] References Cited
UNITED STATES PATENTS 3,540,778   11/1970   Bennett.............................. 299/70 X
3,238,647   3/1966    Hall et al. .......................... 172/801

Primary Examiner—Ernest R. Purser
Attorney—James F. Weiler, William A. Stout et al.

[57] ABSTRACT

Providing an impact force on the push arm of a material penetrating tool by the tool carrying vehicle. A cutting tool slidably connected to a tractor in a generally longitudinal direction which is extended and held forwardly of the tractor by hydraulic cylinders which are released as the tractor is pushing the tool forwardly whereby the tractor will move forward and impact the tool push arms greatly increasing the thrust on the tool. A material moving combustion chamber slidably and releasably carried by a tractor and having a hydraulic piston and cylinder assembly for extending and holding the chamber in front of the vehicle and hydraulic control means for slowly releasing the hydraulic pressure when the chamber is fired to absorb the recoil of the chamber explosion.

5 Claims, 6 Drawing Figures

John M. Clark, Jr.
Charles D. Wood
INVENTORS

BY James F. Weiler
William G. Stout
ATTORNEYS

Patented Aug. 14, 1973
3,752,240
2 Sheets-Sheet 2
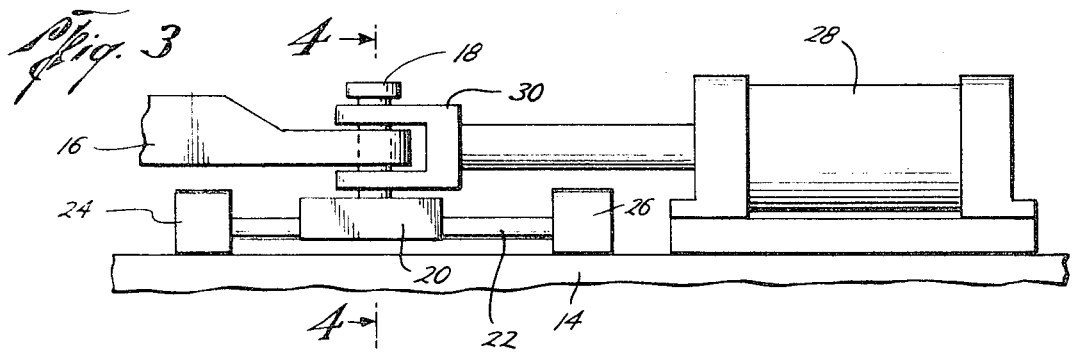
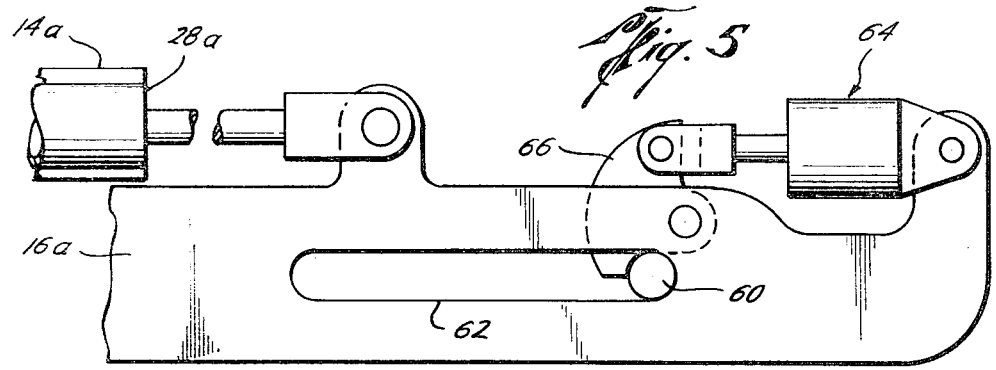
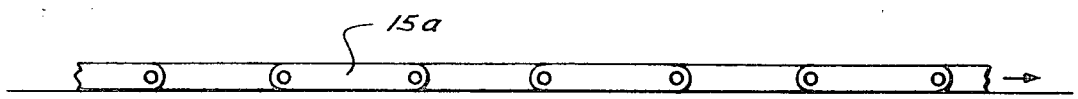
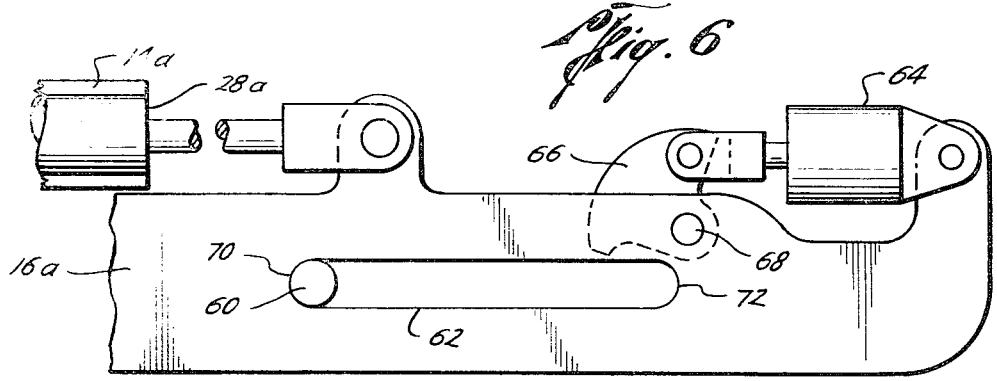
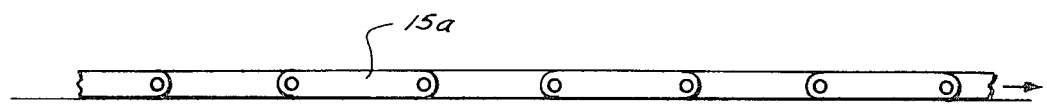
John M. Clark, Jr.
Charles D. Wood
INVENTORS
BY
ATTORNEYS
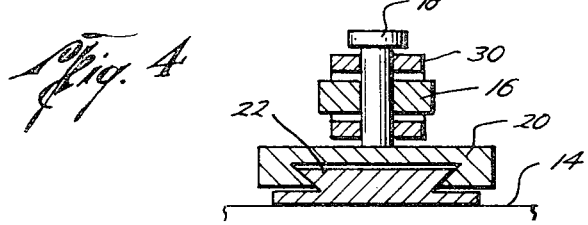

3,752,240

METHOD OF AND APPARATUS FOR PROVIDING AN IMPACT TO A VEHICLED CARRIED PENETRATING TOOL

BACKGROUND OF THE INVENTION

The present invention relates to a vehicle, such as a tractor, adapted to move along the ground and carry a material penetrating tool such as a blade, scraper or ripper, and provide an impact thereto. By way of example only, the present invention will be described in connection with a tractor for earth moving, however, it is to be understood that the present invention is also useful in moving other types of materials utilizing other types of vehicles and tools.

While the use of a hydraulic piston and cylinder assembly for moving a blade on a tractor is old as shown in U.S. Pat. No. 2,964,863, the present invention is directed to releasably connecting the working or material penetrating tool to the vehicle and as the vehicle is moved forward to release the vehicle from the penetrating tool to allow the vehicle to move forward and strike the push arm of the tool to greatly increase the thrust above the normal static thrust of the vehicle.

SUMMARY

The present invention relates to a method of and an apparatus for providing an increased impact by a vehicle adapted to move on the ground and carry a material penetrating tool which is slidably connected to the vehicle in which the vehicle extends and holds the tool in front of the vehicle and then releases the tool and accelerates forward for impacting the tool to provide a greater thrust than normal.

A further object of the present invention is the provision of a tractor carrying a tool which is slidably connected to the tractor in a generally longitudinal direction in which a hydraulic piston and cylinder assembly is connected between the tractor and the tool whereby hydraulic pressure may extend the tool in front of the tractor and the hydraulic pressure may be dumped rapidly for allowing the vehicle to accelerate towards the tool and strike the tool to provide an increased thrust force.

A still further object of the present invention is the improvement in a vehicle carrying a material penetrating tool slidably connected to the vehicle of a releasably engaging sear connected between the vehicle and the tool, and a hydraulic piston and cylinder assembly connected to and releasably holding the sear for disengaging the vehicle for movement relative to the tool.

Yet a further object of the present invention is the provision of a vehicle having as the tool a material moving combustion chamber with an electrical ignition circuit and which is slidably connected to the vehicle and having a hydraulic piston and cylinder assembly for extending and holding the chamber in front of the vehicle with means for rapidly dumping the hydraulic pressure for releasing the vehicle from the chamber to provide an impact thereto, and including control means having a choke for slowly dumping hydraulic pressure in which the control means is connected to and actuated by the electrical ignition circuit of the combustion chamber to absorb the recoil of the combustion chamber.

BRIEF DESCRIPTION OF THE DRAWINGS

FIG. 3 is an enlarged fragmentary elevational view, showing the connection of the penetrating tool to the vehicle, FIG. 4 is a cross-sectional view taken along the line 4—4 of FIG. 3, FIG. 5 is an enlarged fragmentary elevational view of a modification of slidably connecting the material penetrating tool to the vehicle in position with the tool extended to its furthermost forward position from the vehicle, and FIG. 6 is an elevational view similar to that of FIG. 5 showing the release of the vehicle from the tool wherein the vehicle has moved forward and impacted the push arms of the tool.

DESCRIPTION OF THE PREFERRED EMBODIMENT

Figure 1:
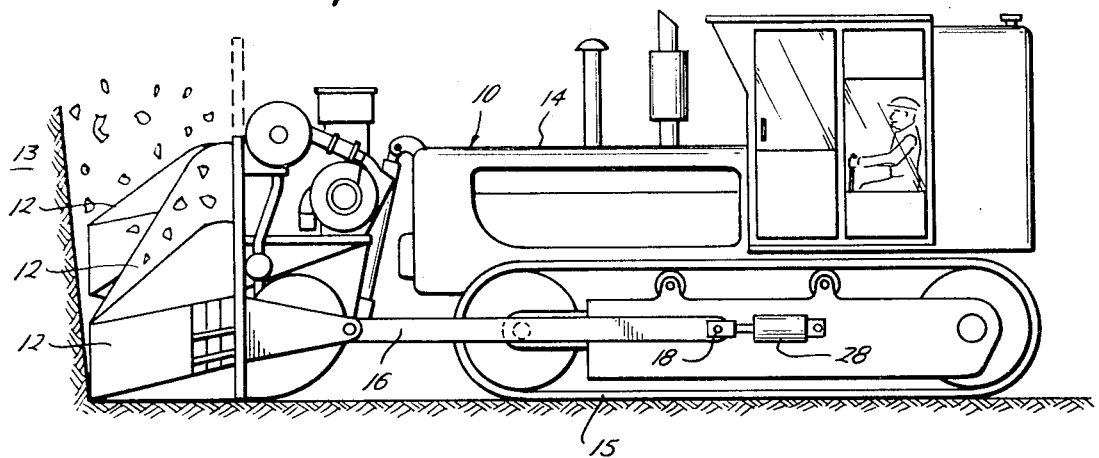
FIG. 1 is an elevational view of the present invention shown in use on a tractor having a material moving combustion chamber tool thereon.

The present invention is suitable for use on any vehicle to move along the ground and carry a material penetrating tool. By way of example only, the invention will be described in connection with a tractor carrying a plurality of material moving combustion chambers as the tool for moving soil, such as more fully described in U.S. Pat. No. 3,461,577. Thus, referring to FIG. 1, the numeral 10 generally indicates the apparatus of the present invention in use for earth moving and generally includes a material penetrating tool such as a plurality of combustion chambers 12 which may be periodically moved into the soil 13 to be moved by a suitable vehicle, such as a tractor 14, and provide an explosive force which is directed from the chambers 12 and against the soil to displace and move the soil. The combustion chambers 12 have sharp leading edges which are driven into the soil 13 and charged with a suitable combustive mixture such as an air/fuel mixture and combustion is initiated by a suitable ignition source (not shown) all as more fully described in U.S. Pat. No. 3,461,577. The resulting explosion will rupture, fragment and displace the soil more effectively than other tools such as a blade or shovel.

As best seen in FIGS. 1, 2, 3 and 4, the material penetrating tool 12 is supported by push arms 16 from the vehicle or tractor 14 and slidably connected to the tractor 14 in a generally longitudinal direction to allow the tool or chambers 12 to be extended and held forwardly of the tractor 14 while the tractor pushes the tool 12 into the soil 13. Thus the push arms 16 are connected to trunnion pins 18 which in turn are connected to a sliding block 20 which rides on a dovetailed track 22 on the tractor 14 which allows movement of the pin 18 and end of the push arms 16 longitudinally relative to the tractor 14. Stop blocks 24 and 26 are provided at either end of the track 22 for limiting the extend of travel of the trunnion pins 18 and ends of the push arms 16. A hydraulic piston and cylinder assembly 28 is connected to each of the trunnion pins 18 such as by piston arm 30.

The present invention is directed to moving the push arms 16 and the connected penetrating tool or chambers 12 forward of the vehicle or tractor 14 and holding them in the forward position while the tractor 14 pushes the tool 12 into the material to be penetrated. When the tractor is developing a maximum force the hydraulic fluid in the assemblies 28 is quickly dumped allowing the tractor 14 to move forward relative to the tool 12 causing the stop 26 to strike the sliding block 20 thus impacting the push arms 16 and chambers 12 further into the soil 13.

Thus, the push arm force of a vehicle 14 that is available for causing the material penetrating tool or chambers 12 to penetrate a material such as the soil can be considerably increased by utilizing the impact force created by suddenly converting the kinetic energy of the free moving heavy vehicle 14 into a thrust force. Normally, the push arm force approximately equals the weight of the vehicle. That is, $F = W$ in a steady state push of the tractor 14 against the push arms 16 where $F$ is the thrust in pounds and $W$ is the weight of the vehicle 14 in pounds.

The present invention utilizes the kinetic energy of the tractor by releasing the tractor in a longitudinal direction rom the penetrating tool 12 to allow the tractor to move forward freely and impact the push arms 16 to increase the tractor's forward thrust above the value available from the static thrust through the tractor tracks 15. Upon impact, the tractor is decelerated in a very short distance to increase the available impact force, and the equation for the push arm thrust becomes:

$$F = W\, V^2/g\, 2s$$

Where $F$ = thrust in pounds
  $W$ = weight of tractor in pounds
  $v$ = velocity of a tractor in feet per second at instant of impact
  $s$ = distance in feet traveled by the tractor in decelerating to a stop.

Depending upon the operating conditions, the total resulting thrust can be as great as three times the steady state push.

Figure 2:
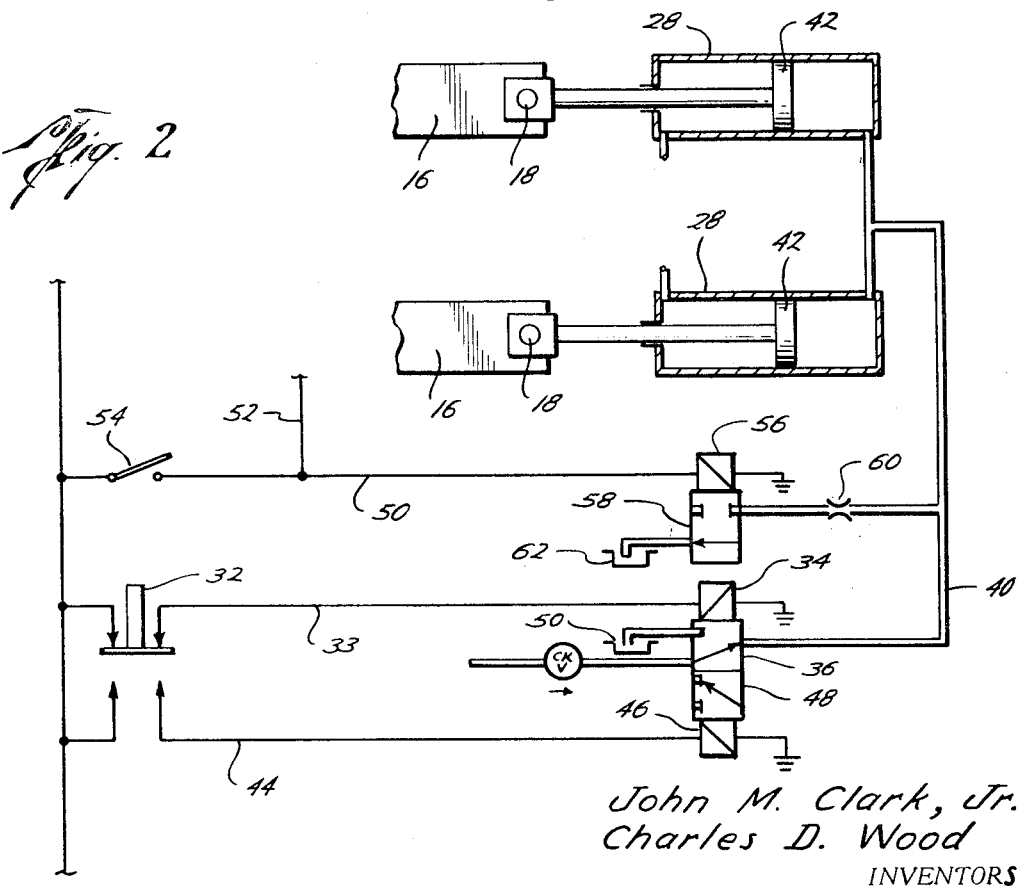
FIG. 2 is a hydraulic schematic diagram of the hydraulic power and control circuits of the present invention.

Referring now to FIG. 2, a hydraulic circuit for actuating the hydraulic piston and cylinder assemblies 28 is shown wherein an electrical switch 32 normally energizes a circuit 33 to a solenoid valve 34 to place the valve 36 in the position shown whereby hydraulic fluid is provided from a source 38 through the valve 36 and into line 40 to provide hydraulic fluid in the assemblies 28 behind the pistons 42 to move the push arms 16 and thus the penetrating tool or combustion chambers 12 forward of the tractor 14 and hold them in a forward position. The tractor 14 is then moved forward to push the combustion chambers 12 into the soil through the hydraulic assemblies 28. In order to obtain a maximum thrust force, the tractor 14 is pushed forward under its own power to develop a maximum pushing force that is just less than the point at which the tracks 15 start to slip. Since this point will be different under different operating conditions, the operator can at the desired point actuate electrical switch 32 (FIG. 2) and electrical circuit 44 and actuate solenoid 46 to bring electrical valve 48 into position between a dump reservoir 50 and line 40 thereby rapidly dumping the fluid from the assemblies 28 to the reservoir 50 and releasing the longitudinal connection of the vehicle 14 and the chambers 12 to allow the track 22 (FIG. 3) to move through the sliding block 20 and thereafter causing the stop block 26 to impact against the sliding block 20 to provide the kinetic energy thrust through the push arms 16 to drive the combustion chambers 12 further into the soil. The impact of the stop block 26 against the sliding block 20 creates a large penetration force since the entire momentum of the tractor 14 generates the impact force. If desired, the switch 32 may then be returned to its place in circuit 33 again actuating the hydraulic piston and cylinder assemblies 28 to move the push arms 16 which will, if the combustion chambers 12 do not further penetrate the soil, slide the tracks 15, and will move the sliding block 20 back to its original position adjacent the stop 24. The manual switch 32 may again be actuated to repeat the impact cycle as many times as required to obtain full penetration of the combustion chambers 12 into the soil 13, and all of this can be accomplished with the tractor 14 in full forward thrust.

Of course, once the combustion chambers 12 penetrate the soil to the desired position, the air/fuel mixture is fed to the chambers 12 where it is exploded to create high pressures and temperature gases which will rupture the soil into fragments all as more fully described in U.S. Pat. No. 3,461,577. Of course, the explosion in the chambers 12 creates a recoil tending to push the tractor backwards and the hydraulic circuit in FIG. 2 shows an additional circuit which may be used to absorb the recoil due to the explosion in the chambers 12. Thus, an electrical circuit 50 which is the electrical ignition circuit to the combustion chambers 12 through line 52 is actuated by a firing switch 54 and when so actuated actuates solenoid 56 to move the valve 58 into the open position so that when the recoil force occurs hydraulic fluid is forced from the assemblies 28 through the line 40 and through a choke or orifice 60 to a reservoir 62. The orifice or choke 60 is sized to suitably absorb the recoil energy of the combustion chambers 12. Of course, the circuit 50 is not needed if the combustion chamber type tool is not used.

Of course, various modifications or additions may be made to the present invention such as shown in FIGS. 5 and 6 where for convenience of references, like numerals are used to denote like parts to those shown in FIGS. 1–4, with the exception of the addition of a suffix "a." Thus, arms 16a are adapted to be slidably moved on a trunnion pin 60 connected directly to the body 14a of the tractor by means of a slot 62 and wherein the arms 16a are moved forward of the tractor by means of a hydraulic piston and cylinder assembly 28a.

A second hydraulic piston and cylinder assembly 64 is shown connected to the arms 16a and actuate and control a sear 66 which pivots about a pin 68 and is adapted to engage and hold trunnion pin 60. Thus, as shown in FIG. 5, the push arms 16a are held in a forwardly extending position relative to the tractor 14a and in this position as the tractor moves forward on the tracks 15a and the push arms 16a develop a force approximately equal to the tractor drive. After the tracks 15a develop a maximum force, that is, one that is just less than the point at which the tracks 15a start to slip, the hydraulic fluid in the assembly 64 is dumped to release the sear 66 which rapidly releases the trunnion pins 60 to allow the tractor 14a to accelerate forward under a thrust approaching full push arm thrust until the trunnion pin 60, as best seen in FIG. 6, impacts the end 70 of the slot 62 to develop a net instantaneous peak force which is composed of the peak deceleration force developed by the rapid deceleration of the vehicle 14a plus some dynamic component of the static track thrust force. Hydraulic fluid can then be actuated into assemblies 28a to again move the trunnion pin 60 back to the end 72 of the slot 62 again extending the push arms 16a out in front of the tractor 14a. In addition, the assemblies 28a may be used as a recoil mechanism to absorb the recoil of the explosions in the combustion chamber 16 as previously indicated in connection with the circuit of FIG. 2. The hydraulic pressure in assemblies 64 may be placed under the control of the operator so that the force at which the sears 66 are released can be adjusted to conform with the changing coefficient of friction between the tracks 15a and the ground. Thus, the operator can adjust the operation to develop a maximum force without slippage of the tracks 15a prior to release of the trunnion pins 60.

In use, the material penetrating tool or combustion chambers 12 are extended forward and held by the action of the switch 32 (FIG. 2) actuating solenoid 34 to apply hydraulic pressure to the assemblies 28. The forward movement of the tractor 14 causes the penetrating tool 12 to penetrate the soil by the normal thrust of the tractor 14. Switch 32 is then actuated energizing solenoid 46 moving valve 48 into position to rapidly dump the hydraulic fluid from the assemblies 28 and into the reservoir 50 thereby longitudinally disconnecting the tractor 14 from the tool 12. The tractor 14 is allowed to accelerate forward until the stop block 14 strikes the sliding block 20 creating a large impact force. The arms 16 are extended again and the combustion chambers 12 may be ignited to create an explosion for displacing the soil by actuating switch 54 and the present invention may also be used to absorb the recoil of the explosion by actuating solenoid valve 56 to slowly release the hydraulic pressure in the assemblies 28 through the choke 60. The embodiment of FIGS. 5 and 6 is similarly operated with the addition of hydraulic assemblies 64 which release sears 66 which in their actuated position hold the push arms 16a in a forward position relative to the tractor 14. On release of sears 66, the connection between the tractor 14a and arms 16a is quickly and completely released to provide the desired impact.

The present invention, therefore, is well adapted to carry out the objects and attain the ends and advantages mentioned as well as others inherent therein.

What is claimed is:

1. The method of operating a vehicle adapted to move along the ground having a material penetrating tool slidably connected to the vehicle in a generally longitudinal direction to the vehicle for providing an increased thrust force comprising, hydraulically extending and holding the tool forward of the vehicle, while holding the tool in a forwardly extending position pushing the penetrating tool forward by the vehicle into the material, while pushing the tool forward releasing the holding action between the vehicle and the tool whereby the vehicle will move forward and impact the tool, keeping the vehicle engaged for forward movement, again hydraulically extending and holding the tool forward of the vehicle, and again releasing the holding action between the vehicle and the tool whereby the vehicle will move forward and impact the tool.

2. A vehicle adapted to move on the ground and carrying a material penetrating tool slidably connected to the vehicle in a generally longitudinal direction to the vehicle to provide an increased forward thrust and a first hydraulic piston and cylinder assembly connected between the vehicle and the tool, the improvement comprising, a releasable engaging sear connected between the vehicle and the tool, and a second hydraulic piston and cylinder assembly connected to and releasably holding the sear.

3. A vehicle adapted to move on the ground and carrying a material penetrating tool slidably connected to the vehicle in a generally longitudinal direction to the vehicle to provide an increased forward thrust comprising, a hydraulic piston and cylinder assembly connected between the vehicle and the tool, means for providing hydraulic pressure in said assembly in a direction to extend the tool in front of the vehicle, means for rapidly dumping said hydraulic pressure for allowing the vehicle to accelerate forward toward the tool, stop means between the vehicle and the tool for allowing the moving vehicle to strike the tool thereby providing a thrust force to the tool, and control switching means for actuating and deactuating said hydraulic piston and cylinder assembly connected to said assembly.

4. A vehicle adapted to move on the ground and provide an increased forward material penetrating thrust comprising, a material moving combustion chamber having an electrical ignition circuit and carried by the vehicle and slidably connected to the vehicle in a generally longitudinal direction, a hydraulic piston and cylinder assembly connected between the vehicle and the chamber, means for providing hydraulic pressure in said assembly in a direction to extend and hold the chamber in front of the vehicle, means for rapidly dumping said hydraulic pressure for allowing the vehicle to move forward toward the chamber, stop means between the vehicle and the chamber for allowing the moving vehicle to impact the chamber thereby providing a thrust force to the chamber, and control means including a choke for slowly dumping said hydraulic pressure, said control means being connected to and actuated by the electrical ignition circuit of said combustion chamber to absorb the recoil of the chamber explosion.

5. The method of operating a tractor having a material penetrating tool slidably connected to the tractor in a generally longitudinal direction to the tractor to provide an increased thrust force comprising, longitudinally extending and holding the tool forwardly of the tractor by hydraulic means, while holding the tool in a forwardly extending position pushing the penetrating tool into the material by the forward movement of the tractor, and while continuing forward movement of the tractor with the extendedly held tool, releasing the holding action between the tractor and the tool whereby the tractor will move forwardly and impact the tool.

* * * * *